M. J. BUSHONG.
TRACTOR FOR AGRICULTURAL IMPLEMENTS AND THE LIKE.
APPLICATION FILED JUNE 8, 1911.

1,048,940.

Patented Dec. 31, 1912.

2 SHEETS—SHEET 1.

Witnesses
J. Clarkson
G. Newton Benjamin

Inventor
M. J. Bushong
By Frederick Benjamin
Atty.

M. J. BUSHONG.
TRACTOR FOR AGRICULTURAL IMPLEMENTS AND THE LIKE.
APPLICATION FILED JUNE 8, 1911.

1,048,940.

Patented Dec. 31, 1912.

2 SHEETS—SHEET 2.

Witnesses

Inventor
M. J. Bushong
By Frederick Benjamin
Attorney

UNITED STATES PATENT OFFICE.

MAHLON J. BUSHONG, OF MANASSAS, VIRGINIA.

TRACTOR FOR AGRICULTURAL IMPLEMENTS AND THE LIKE.

1,048,940.  Specification of Letters Patent.  Patented Dec. 31, 1912.

Application filed June 8, 1911. Serial No. 632,057.

*To all whom it may concern:*

Be it known that I, MAHLON J. BUSHONG, a citizen of the United States of America, residing at Manassas, in the county of Prince William and State of Virginia, have invented certain new and useful Improvements in Tractors for Agricultural Implements and the Like, of which the following is a specification.

The present invention has reference to tractors for agricultural implements and the like, and more especially to tractors of the "two wheel" type, wherein the entire tractor is turned bodily by the same power that propels it in order to effect the steering of the vehicle.

It comprehends, essentially certain improvements, hereinafter described at length, in or relating to the driving connections between the motor and the mechanism for producing the requisite swinging movement of the frame or body of the vehicle, the construction and arrangements of the various parts or elements included in the aforesaid driving connections being such as to insure a maximum strength, durability and efficiency and a certainty of action.

Figure 1:
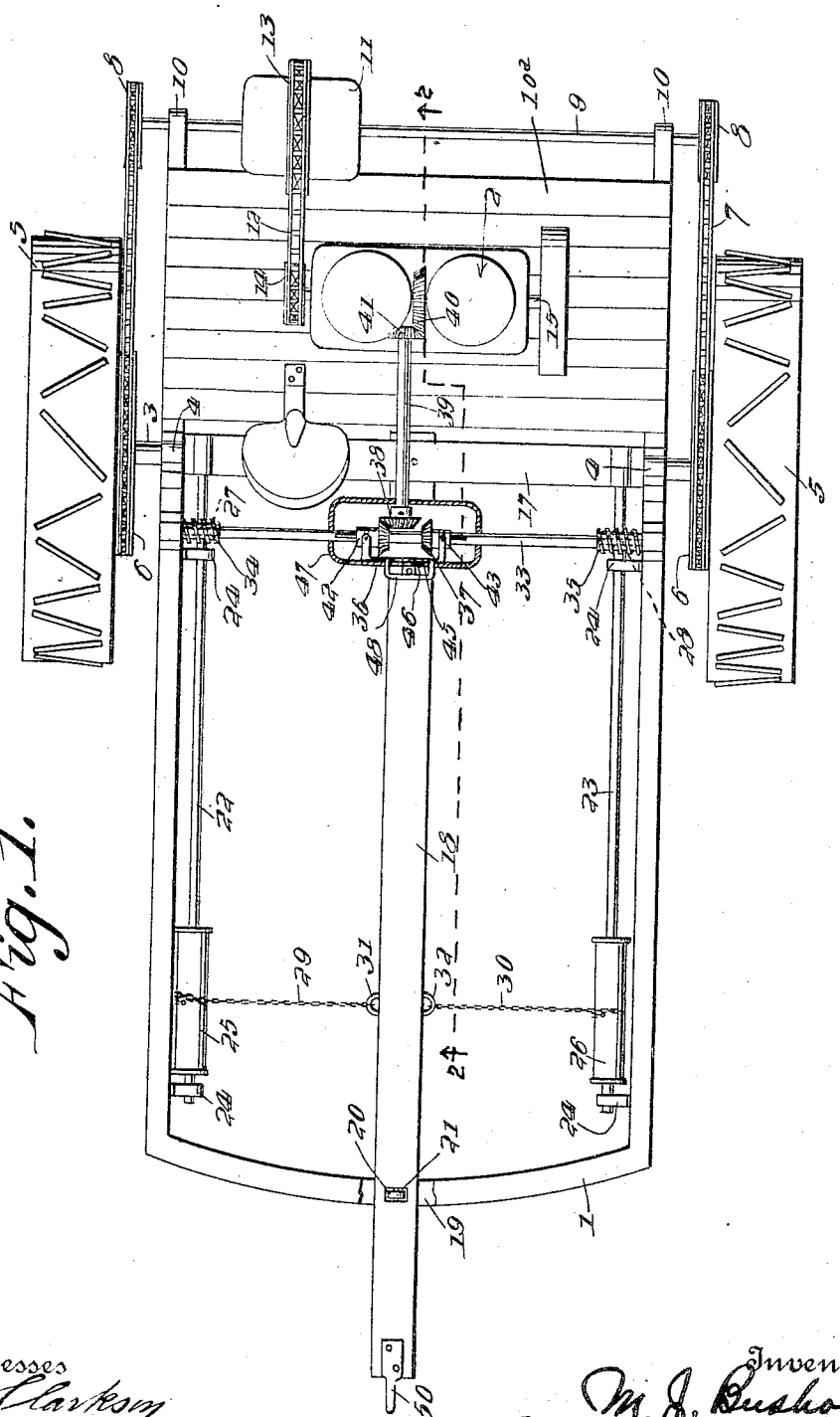
Figure 2:
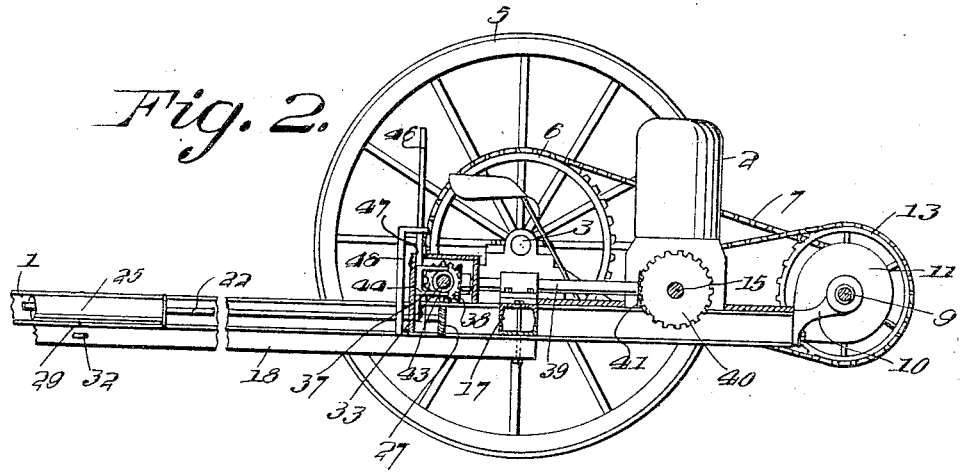
Figure 3:
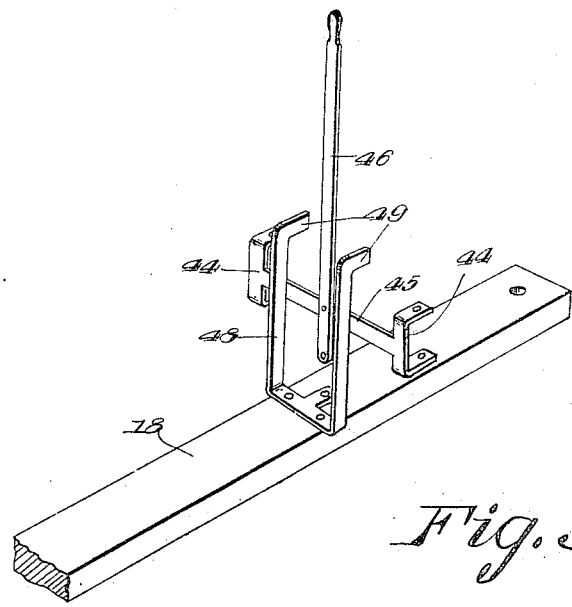

A structural embodiment of the invention is illustrated in the accompanying drawings which form a part of this application, whereof;

Figure 1 is a top plan view of the improved tractor; Fig. 2 is a longitudinal vertical sectional view, taken on the line 2—2 of Fig. 1, and Fig. 3 is a perspective view showing the mounting of the reversing lever and safety device.

In said drawings, 1 designates generally the frame, 2 the motor and 3 the axle of the vehicle, the element last referred to being journaled in suitable bearings 4 mounted upon the sills of the frame and carrying upon its ends the traction wheels 5, which latter, are provided with sprockets 6 secured thereto in any desired manner and connected by driving chains 7 with smaller sprockets 8 fast upon the ends of the differential shaft 9. Said shaft 9 is journaled in bearing brackets 10 attached to the front ends of the sill frame and the differential 11 which it carries is driven from the motor 2 by means of a chain 12 that connects the sprockets 13 and 14, the former of these sprockets being secured to the differential itself, and the latter to the motor shaft 15. The motor is mounted upon a platform 10ª on frame 1, and may consist of either an oil or gasolene engine of any conventional or suitable make.

In advance of the platform is located a cross-beam 17 secured at its ends to the frame sills and having pivoted to its central portion the front end of the draft beam 18. The latter beam is arranged longitudinally of frame 1, as will be understood and its rear portion extends through a longitudinal slot 19 formed in the rear frame sill and is provided with an anti-friction roller 20 mounted in a seat or opening 21 and adapted to engage the upper and lower walls of slot 19. Beam 18 is designed to be held in a substantially stationary position during the steering of the vehicle, the frame of the latter moving relatively thereto at such times.

To effect the movements of the frame just referred to the inner faces of the side sills of said frame are equipped with a pair of longitudinally arranged horizontal shafts 22 and 23 supported in brackets 24 secured to said faces. These shafts are respectively provided at their rear ends with drums 25 and 26 and at their front ends with worm wheels 27 and 28, as shown in Fig. 1. Drums 25 and 26 are connected respectively to the draft beam 18 by cables 29 and 30 or similar flexible elements, which are fastened thereto at one end and attached at the other end to eyes 31 and 32 secured to the beam, said cables being trained over the corresponding drums in opposite directions so that one will unwind when the other is wound up.

The requisite synchronous rotation of shafts 22 and 23 is produced through the intermediary of a suitably mounted cross shaft 33 provided at its ends with worms 34 and 35 and intermediate its ends with a pair of oppositely facing bevel gears 36 and 37. Worms 34 and 35 are designed to respectively engage and drive the worm wheels 27 and 28 while gears 36 and 37 are designed to be interchangeably engaged with and driven by a bevel gear 38 mounted on the rear end of a countershaft 39 which is driven from the engine 2 by means of intermeshing bevel gears 40 and 41.

Gears 36 and 37 are borne, respectively, by sliding sleeves 42 and 43 which are keyed to the cross shaft 33 and are loosely connected to the forked ends 44 of a yoke 45 shifted by a reversing lever 46 that is loosely connected to the central portion of the yoke and is fulcrumed upon the rear wall of the case 47 that incloses said yoke and the gears 36, 37 and 38, said case being mounted upon the forward portion of beam 18. The arrangement above described is such, therefore, that movement of lever 46 in one direction will have the effect of engaging gears 36 and 38 and in consequence of rotating shafts 33, 22 and 23 in one direction, while movement of said lever in the opposite direction will produce engagement of gears 37 and 38 with alternate rotation of shafts 33, 22 and 23 in the other direction. To prevent excess movement of the reversing lever in either direction there is mounted upon beam 18 an upstanding U-shaped bracket 48 the terminals 49 of whose legs are extended laterally into the path of movement of said lever so as to form stops.

As shown in Fig. 1 the rear end of the draft beam extends an appreciable distance beyond the adjacent frame member and is provided with a terminal hook 50 or analogous device by means whereof it may be coupled to the implement, cart or other body (illustration of which is omitted) that is to be propelled or drawn. The attachment of such body to the beam end will obviously serve to hold said beam in an approximately stationary position and therefore, the actuation of the cable mechanism will occasion a swinging movement of the frame, and the traction wheels relative to said beam, this being due to the fact that the power necessary to move the implement or body sidewise is greater than that required to turn the wheeled frame, so that the points at which the traction wheels contact with the ground will form the pivots upon which said wheels and frame turn.

The operation of the invention is believed to be apparent from the foregoing, and it is merely necessary to state therefore, that when it is desired to turn the tractor the reversing lever is shifted in the proper direction to produce the requisite rotation of the cable shafts, whereupon one of the cables will be wound upon its drum, while the other is unwound, and will in consequence draw the adjacent side sill of the frame toward the stationary reach, thus effecting the turning of the frame and the traction wheels.

When the cable mechanism is in motion it will be seen that both of the shafts 22 and 23 rotate simultaneously in the same direction, by reason of this fact tension is exerted at the same time upon both cables, and the latter therefore are constantly maintained taut.

The arrangement of the worms 34 and 35 meshing with cog wheels 27 and 28 prevent a dragging thus holding the frame in a positive position.

Having thus described my invention, what I claim as new is,—

1. In a two wheel tractor, the combination with a wheeled frame and engine mounted thereon, and driving connections between the wheel and said engine, of a reach pivoted at one end to said frame and adapted for connection at its other end to the body to be hauled, and mechanism for turning said frame and said wheels bodily relative to said beam comprising a pair of drums mounted upon said frame at opposite sides of the beam, a pair of flexible elements connected at one end to the corresponding drums and at the other end to said beam, driving connections between said engine and said drums for simultaneously rotating the latter in the same direction, and reversing mechanism associated with the last mentioned driving connections.

2. In a two wheel tractor, the combination with a wheeled frame and engine mounted thereon, and driving connections between the wheel and said engine, of a reach pivoted at one end of said frame and adapted for connection at its other end to the body to be hauled, and mechanism for turning said frame and said wheels bodily relative to said beam comprising a pair of longitudinal shafts secured to said frame upon opposite sides of the beam, a drum secured to each shaft, a pair of flexible elements having their outer ends wound around said drums in opposite directions and their inner ends connected to said beam, driving means operatively connected with the engine for simultaneously rotating said shafts in the same direction, and reversing mechanism associated with said driving means.

3. In a two wheel tractor, the combination with a wheeled frame, an engine mounted thereon, and driving connections between the wheels and said engine, of a stationary draft beam pivoted at one end to said frame, and adapted for connection at its other end to the body to be hauled, and mechanism for turning said frame and said wheels bodily relative to said beam comprising a pair of drums mounted upon said frame at opposite sides of the beam, a pair of flexible elements connected at one end to the corresponding drums and at the other end to said beam, a countershaft operatively connected with the engine shaft, a cross shaft driving connection between the ends of said cross shaft and said drums, a gear carried by said counter shaft, a pair of oppositely facing connected gears slidably mounted on said cross shaft and adapted for interchangeable engagement with the first named gear and a reversing lever respectively connected with said sliding gear.

In testimony whereof I affix my signature in presence of two witnesses.

MAHLON J. BUSHONG.

Witnesses:
 THOS. H. LION,
 W. L. DIEHL.